(12) United States Patent  
Wakimoto

(10) Patent No.: US 11,355,826 B2
(45) Date of Patent: Jun. 7, 2022

(54) SECONDARY BATTERY

(71) Applicant: SANYO Electric Co., Ltd., Daito (JP)

(72) Inventor: Ryoichi Wakimoto, Hyogo (JP)

(73) Assignee: SANYO Electric Co., Ltd., Daito (JP)

(*) Notice: Subject to any disclaimer, the term of this patent is extended or adjusted under 35 U.S.C. 154(b) by 161 days.

(21) Appl. No.: 16/782,715

(22) Filed: Feb. 5, 2020

(65) Prior Publication Data

US 2020/0313153 A1 Oct. 1, 2020

(30) Foreign Application Priority Data

Mar. 29, 2019 (JP) .............................. JP2019-065563

(51) Int. Cl.
*H01M 50/581* (2021.01)
*H01M 50/172* (2021.01)
*H01M 50/531* (2021.01)

(52) U.S. Cl.
CPC ....... *H01M 50/581* (2021.01); *H01M 50/172* (2021.01); *H01M 50/531* (2021.01); *H01M 2220/20* (2013.01)

(58) Field of Classification Search
CPC ............. H01M 50/581; H01M 50/172; H01M 2220/20; H01M 50/531
See application file for complete search history.

(56) References Cited

U.S. PATENT DOCUMENTS

| 2013/0101875 A1* | 4/2013 | Kim | H01M 50/543 429/61 |
| 2013/0196220 A1* | 8/2013 | Okutani | H01M 50/572 429/179 |
| 2013/0266830 A1* | 10/2013 | Byun | H01M 10/0431 429/61 |
| 2016/0049635 A1* | 2/2016 | Park | H01M 50/538 429/161 |
| 2016/0293931 A1* | 10/2016 | Sawada | H01M 50/325 |
| 2019/0296272 A1* | 9/2019 | Lee | H01M 50/581 |

FOREIGN PATENT DOCUMENTS

JP 2013-219003 A 10/2013

* cited by examiner

*Primary Examiner* — Matthew T Martin
*Assistant Examiner* — Adam J Francis
(74) *Attorney, Agent, or Firm* — WHDA, LLP

(57) ABSTRACT

A collector that electrically connects tabs derived from electrode bodies and terminals of a battery to each other includes a first connection portion to which the conductive member on a tab side is connected, a second connection portion to which the conductive member on a terminal side is connected. The first connection portion and the second connection portion are connected by a connecting portion. The collector opposes the sealing plate with the insulating member in between, the second connection portion includes a fuse portion including a through hole between the conductive member connection portion on the terminal side and the connecting portion, and the fuse portion is disposed so as not to come in contact with the insulating member.

15 Claims, 9 Drawing Sheets

SECONDARY BATTERY

CROSS REFERENCE TO RELATED APPLICATIONS

The present invention application claims priority to Japanese Patent Application No. 2019-065563 filed in the Japan Patent Office on Mar. 29, 2019, the entire contents of which are incorporated herein by reference.

BACKGROUND OF THE INVENTION

Field of the Invention

The present disclosure relates to a secondary battery.

Description of Related Art

Square secondary batteries such as alkaline secondary batteries and nonaqueous electrolyte secondary batteries are used in power sources for driving electric vehicles (EV), hybrid electric vehicles (HEV, PHEV), and the like.

In such square secondary batteries, a battery case is configured of a bottomed cylindrical square outer package including an opening and a sealing plate that seals the opening. The battery case houses therein an electrode body including positive electrode plates, negative electrode plates, separators, and an electrolyte. A positive electrode terminal and a negative electrode terminal are attached to the sealing plate.

The positive electrode terminal is electrically connected to the positive electrode plates through a positive electrode collector, and the negative electrode terminal is electrically connected to the negative electrode plates through a negative electrode collector.

Furthermore, a secondary battery is proposed in which, in order to prevent the battery from becoming damaged by an overcurrent flowing through the battery, a fuse is provided in a collector that electrically connects terminals and electrode bodies to each other.

BRIEF SUMMARY OF THE INVENTION

In a configuration in Japanese Published Unexamined Patent Application No. 2013-219003 (Patent Document 1), an insulating member and a fuse area provided in a collector is in contact with each other. Accordingly, when the fuse becomes actuated due to some shortcoming, the insulating member may become destroyed by the sparks and the heat that have been created, the sealing plate and the collector may come in contact with each other, and reconduction may occur.

The present disclosure has been made to overcome the issue of the conventional technique described above, and provides a secondary battery with high reliability in which reconduction and internal short-circuiting do not occur even after the fuse has been actuated.

Means for Solving the Problems

A secondary battery according to an aspect of the present disclosure includes an electrode body including a tab, an outer package that houses the electrode body, a sealing plate that seals the outer package and that includes a terminal, and a collector that electrically connects the tab and the terminal to each other, in which the collector opposes the sealing plate with an insulating member in between, the collector includes a first connection portion, a connecting portion, and a second connection portion, the tab or a tab conductive member connected to the tab is connected to the first connection portion, the connecting portion connects the first connection portion and the second connection portion to each other, the second connection portion includes a terminal-side connection portion to which the terminal or the terminal conductive member connected to the terminal is connected and a fuse portion provided with a through hole between the terminal-side connection portion and the connecting portion, the fuse portion is disposed so as not to come in contact with the insulating member, the terminal, and the terminal conductive member, and a cross-sectional area in a portion of the through hole in the fuse portion is the smallest in a current path from the tab to the terminal, the fuse portion is thermally cut when an overcurrent flows between the tab and the terminal.

The present invention can provide a secondary battery having a higher reliability.

DETAILED DESCRIPTION OF THE INVENTION

A configuration of a square secondary battery 20, which is a secondary battery according to an exemplary embodiment, will be described below. Note that the present disclosure is not limited to the following exemplary embodiment.

Figure 1:
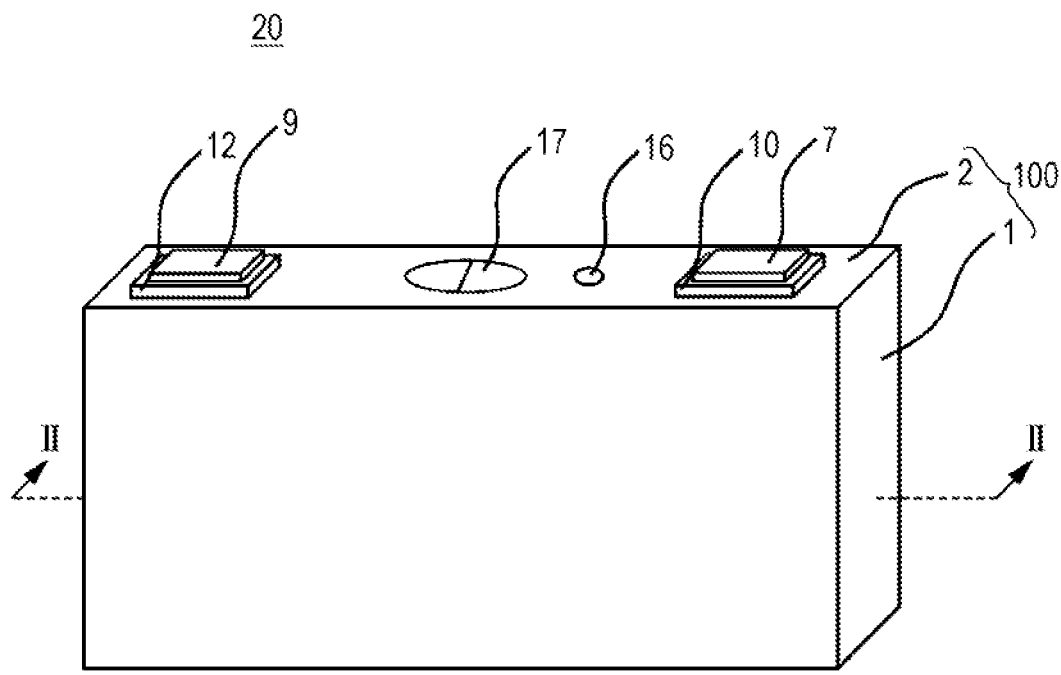
FIG. 1 is a perspective view of a secondary battery according to an exemplary embodiment.
Figure 2:
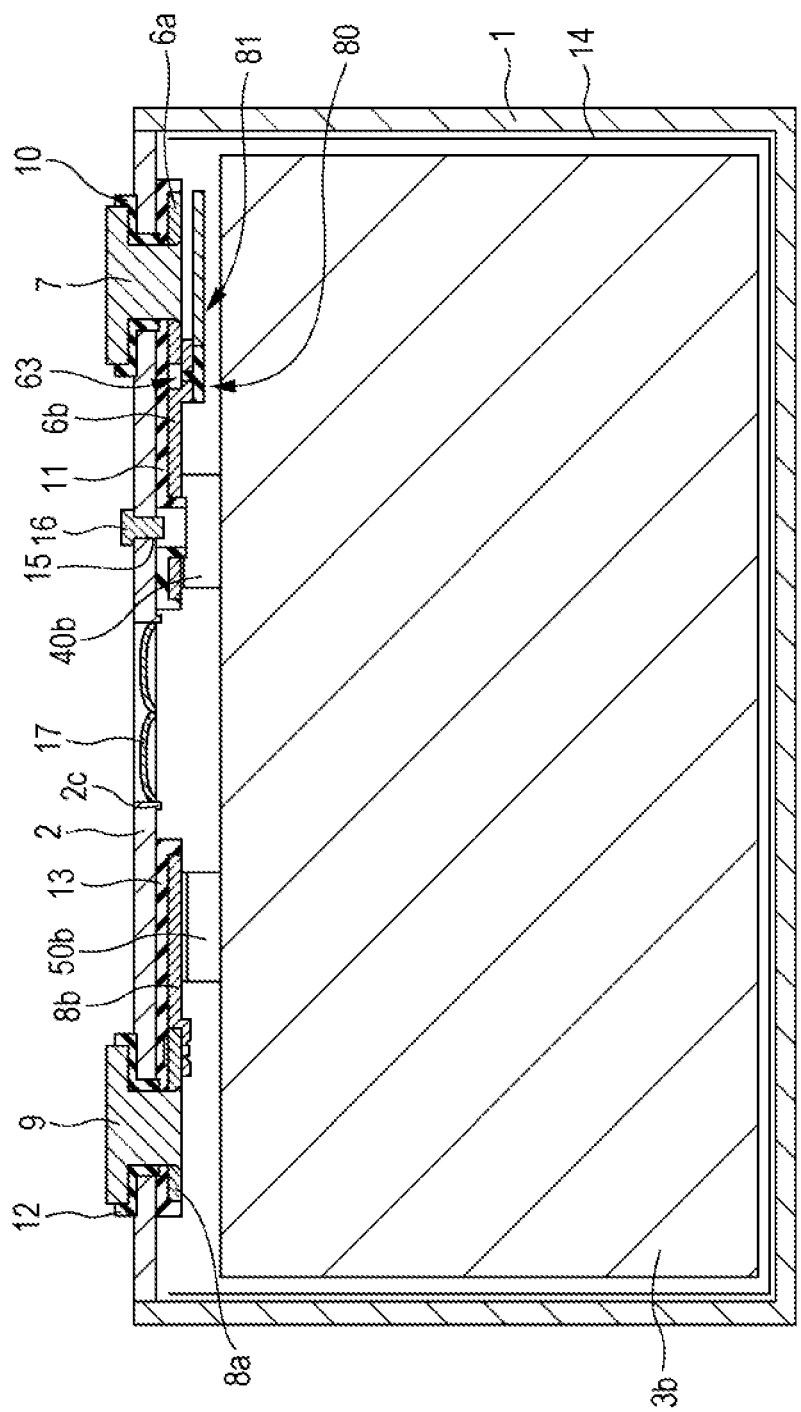
FIG. 2 is a cross-sectional view taken along line II-II in FIG. 1.

As illustrated in FIGS. 1 and 2, the square secondary battery 20 includes a battery case 100 formed of a bottomed and polygonal-tube-shaped square outer package 1 including an opening, and a sealing plate 2 that seals the opening of the square outer package 1. The square outer package 1 and the sealing plate 2 are, desirably, formed of metal and are, desirably, formed of aluminum or an aluminum alloy, for example. An electrode group 3 in which positive electrode plates and negative electrode plates are stacked with separators interposed therebetween are, together with an electrolyte, housed in the square outer package 1.

An electrolyte injection hole 15 is provided in the sealing plate 2, and the electrolyte injection hole 15 is sealed with a sealing member 16. A gas discharge valve 17 that breaks when the pressure inside the battery case 100 becomes equivalent to or higher than a predetermined value and that discharges gas inside the battery case 100 to the outside of the battery case 100 is provided in the sealing plate 2. An annular protrusion 2c is provided on a surface of the sealing plate 2 on a battery inner side and around the gas discharge valve 17.

Positive electrode tab groups 40a and 40b and negative electrode tab groups 50a and 50b are provided at an end portion of the electrode group 3 (electrode bodies 3a and 3b) on a sealing plate 2 side. The positive electrode tab groups 40a and 40b are electrically coupled to a positive electrode terminal 7 through a positive electrode collector 6b and a positive electrode terminal conductive member 6a. The negative electrode tab groups 50a and 50b are electrically coupled to a negative electrode terminal 9 through a negative electrode collector 8b and a negative electrode terminal conductive member 8a.

The positive electrode collector 6b, the positive electrode terminal conductive member 6a, and the positive electrode terminal 7 are desirably formed of metal, and, more desirably, are formed of aluminum or an aluminum alloy. A resin outer insulating member 10 is disposed between the positive electrode terminal 7 and the sealing plate 2. A resin inner insulating member 11 is disposed between the positive electrode collector 6b and the positive electrode terminal conductive member 6a, and the sealing plate 2.

The negative electrode collector 8b, the negative electrode terminal conductive member 8a, and the negative electrode terminal 9 are, desirably, formed of metal and are, more desirably, formed of copper or a copper alloy. A resin outer insulating member 12 is disposed between the negative electrode terminal 9 and the sealing plate 2. An inner insulating member 13 is disposed between the negative electrode collector 8b and the negative electrode terminal conductive member 8a, and the sealing plate 2.

An electrode body holder 14 formed of a resin sheet is disposed between the electrode group 3 and the square outer package 1. The electrode body holder 14 is, desirably, formed of a resin insulating sheet folded and formed into a bag shape or a box shape.

A method of manufacturing the square secondary battery 20 and details of the components thereof will be described next.

Positive Electrode Plate

Figure 3:
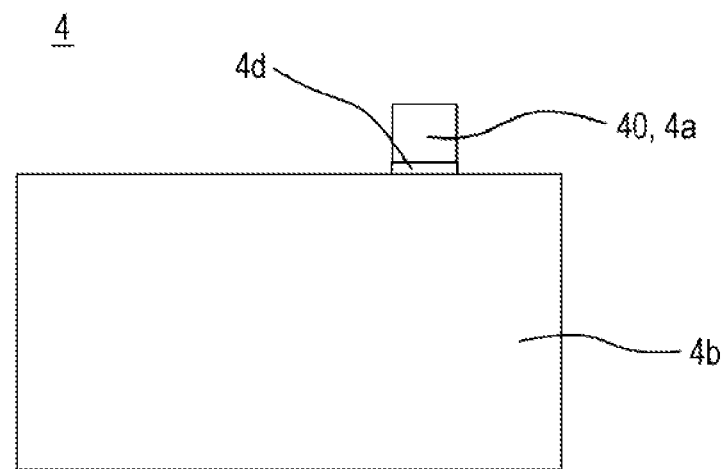
FIG. 3 is a plan view of a positive electrode plate according to the exemplary embodiment.

FIG. 3 is a plan view of a positive electrode plate 4. The positive electrode plate 4 includes a main body portion in which a positive electrode active material mixture layer 4b including a positive electrode active material is formed on each of the two surfaces of a rectangular positive electrode core body 4a. The positive electrode core body 4a protrudes from an edge of the main body portion. The protruded positive electrode core body 4a constitutes the positive electrode tab 40. Note that the positive electrode tab 40 may be a portion of the positive electrode core body 4a, as illustrated in FIG. 3, or another member may be connected to the positive electrode core body 4a as the positive electrode tab 40. Positive electrode protective layers 4d, each having an electrical resistance that is larger than an electrical resistance of each positive electrode active material mixture layer 4b, are desirably provided in portions of the positive electrode tabs 40 adjacent to the positive electrode active material mixture layers 4b. Note that, desirably, metal foil such as aluminum foil or aluminum alloy foil is used for the positive electrode core body 4a. Desirably, lithium-transition metal composite oxide is used for the positive electrode active material.

Negative Electrode Plate

Figure 4:
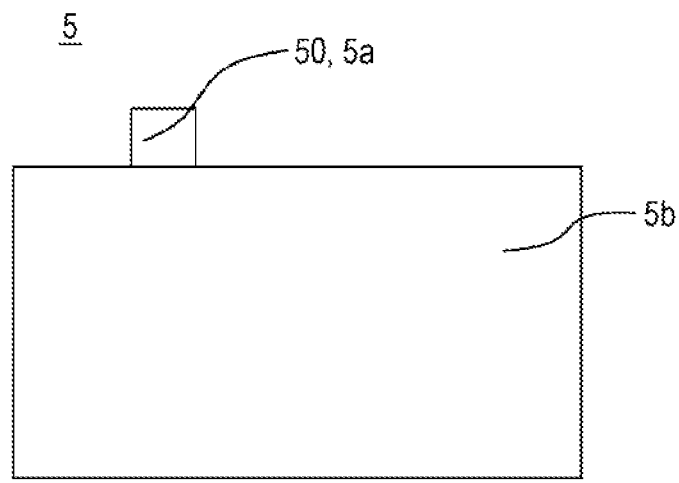
FIG. 4 is a plan view of a negative electrode plate according to the exemplary embodiment.

FIG. 4 is a plan view of a negative electrode plate 5. The negative electrode plate 5 includes a main body portion in which a negative electrode active material mixture layer 5b including a negative electrode active material is formed on each of the two surfaces of a rectangular negative electrode core body 5a. The negative electrode core body 5a protrudes from an edge of the main body portion. The protruded negative electrode core body 5a constitutes the negative electrode tab 50. Note that the negative electrode tab 50 may be a portion of the negative electrode core body 5a, as illustrated in FIG. 4, or another member may be connected to the negative electrode core body 5a as the negative electrode tab 50. Note that metal foil such as copper foil or copper alloy foil is used as the negative electrode core body 5a. Desirably, a material such as a carbon material or a material including silicon is used for the negative electrode active material.

Fabrication of Electrode Body

Figure 5:
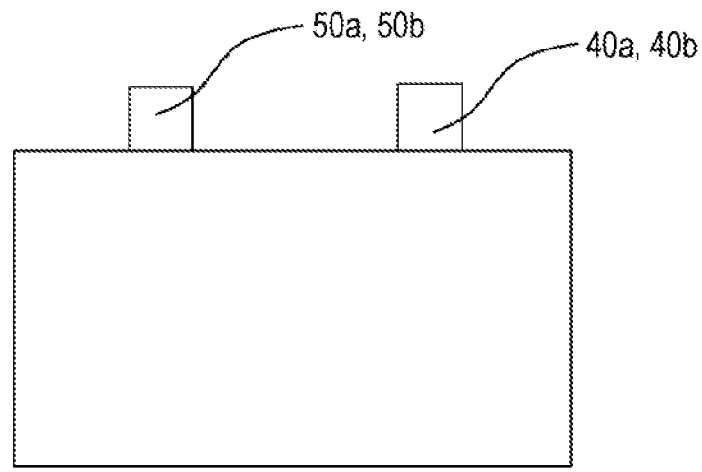
FIG. 5 is a plan view of an electrode body according to the exemplary embodiment.

Stacked electrode bodies 3a and 3b are fabricated by fabricating 50 pieces of positive electrode plates 4 and 51 pieces of negative electrode plates 5 and by stacking the above with a rectangular polyethylene separator in between. As illustrated in FIG. 5, the stacked electrode bodies (the electrode body 3a and the electrode body 3b) include, at one end portion, the positive electrode tab groups 40a and 40b in which the positive electrode tabs 40 of the positive electrode plates 4 are stacked, and the negative electrode tab groups 50a and 50b in which negative electrode tabs 50 of the negative electrode plates 5 are stacked. Separators are disposed on the outer surfaces of the electrode bodies 3a and 3b, and each electrode and the separators are fixed in a stacked state by winding an adhesive tape or the like around the external peripheral surfaces of the electrode bodies 3a and 3b. Alternatively, an adhesion layer may be provided on each surface of the separators so that the separators and the positive electrode plates 4, and the separators and the negative electrode plates 5 are adhered to each other.

Note that the size of the separator in plan view is, desirably, the same as that of the negative electrode plate 5 or is larger than that of the negative electrode plate 5. Each positive electrode plate 4 or each negative electrode plate 5 may be disposed between two separators and after heat welding the outer peripherals of the separators, the positive electrode plates 4 and the negative electrode plates 5 may be stacked on each other. Alternatively, the stacked electrode body may be formed by folding a long separator in a zigzag manner and by alternately disposing the positive electrode plate 4 and the negative electrode plate 5 between the folds to stack the positive electrode plates 4 and the negative electrode plates 5 on each other. Note a wound electrode body may be formed by winding a belt-shaped positive electrode plate and a belt-shaped negative electrode plate with a belt-shaped separator interposed in between.

Connecting Collectors and Tabs to Each Other

Figure 6:
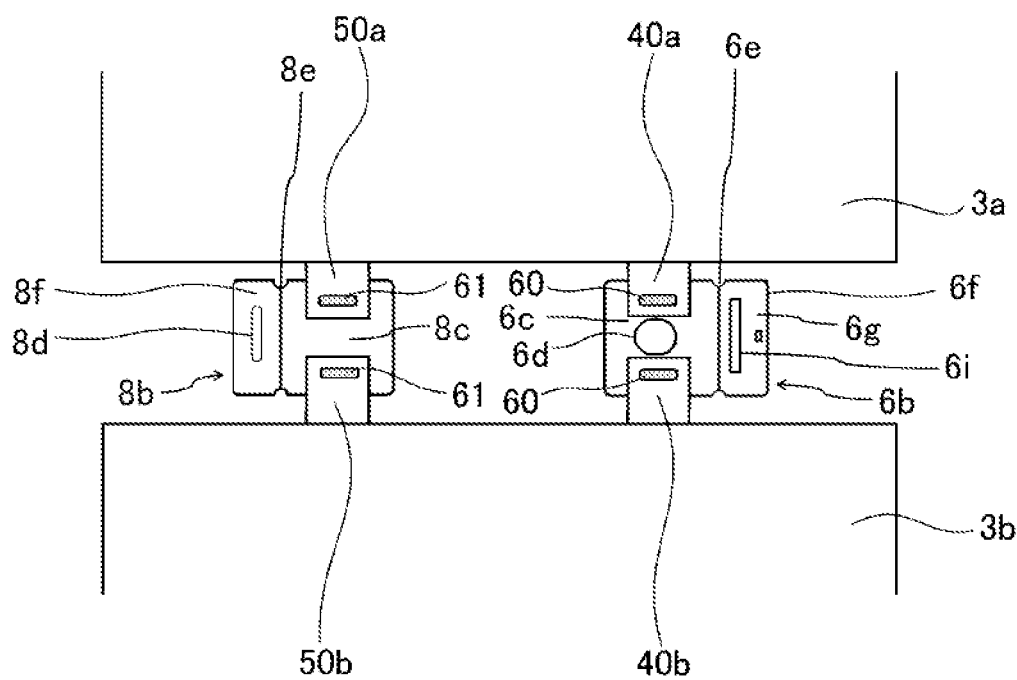
FIG. 6 is a diagram illustrating a state in which positive electrode tab groups are connected to a positive electrode collector, and negative electrode tab groups are connected to a negative electrode collector.

FIG. 6 is a diagram illustrating a state in which the positive electrode tab group 40a and the positive electrode tab group 40b are connected to the positive electrode collector 6b and in which the negative electrode tab group 50a and the negative electrode tab group 50b are connected to the negative electrode collector 8b. In the positive electrode collector 6b, a first connection portion 6c and a second connection portion 6f are connected to each other through a connecting portion 6e. In the negative electrode collector 8b, a first connection portion 5c and a second connection portion 8f are connected to each other through a connecting portion 5e.

As illustrated in FIG. 6, the electrode body 3a and the electrode body 3b are disposed so that distant ends of the positive electrode tab groups 40a and 40b oppose each other and so that the distant ends of the negative electrode tab groups 50a and 50b oppose each other. Subsequently, the positive electrode tab group 40a and the positive electrode tab group 40b are disposed on the first connection portion 6c of the positive electrode collector 6b. Furthermore, the negative electrode tab group 50a and the negative electrode tab group 50b are disposed on the first connection portion 5c of the negative electrode collector 8b. Subsequently, the positive electrode tab group 40a and the positive electrode tab group 40b are each welded and connected to the first connection portion 6c so that welds 60 are formed. Furthermore, the negative electrode tab group 50a and the negative electrode tab group 50b are each welded and connected to the first connection portion 8c so that welds 61 are formed. The welding method is desirably ultrasonic welding or resistance welding, and the connecting may be performed by laser welding.

Configuration of Sealing Plate

Figure 7:
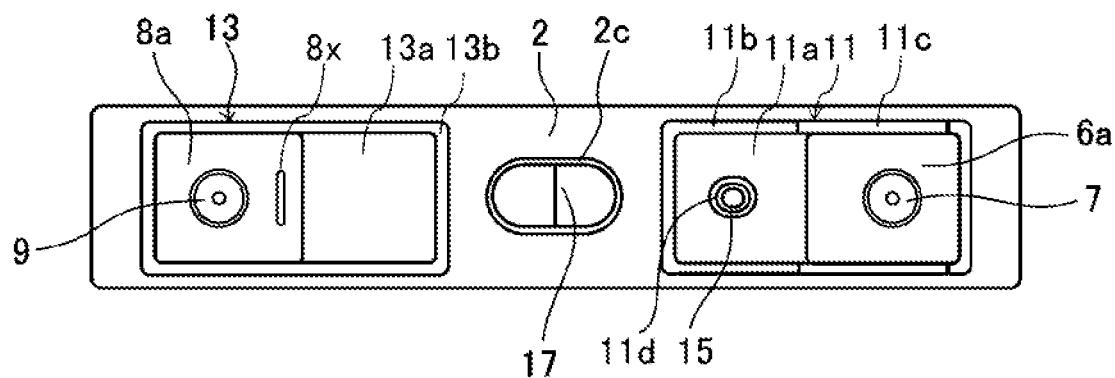
FIG. 7 is a diagram of the sealing plate to which components have been installed, viewed from an electrode group side.

FIG. 7 is a diagram of the sealing plate 2 viewed from the electrode group 3 side after the positive electrode terminal 7, the outer insulating member 10 (not shown), the inner insulating member 11, the positive electrode terminal conductive member 6a, the negative electrode terminal 9, the outer insulating member 12 (not shown), the inner insulating member 13, and the negative electrode terminal conductive member 8a have been attached.

The sealing plate 2, the outer insulating member 10, the inner insulating member 11, the positive electrode terminal conductive member 6a, the outer insulating member 12, the inner insulating member 13, and the negative electrode terminal conductive member 8a each has a through hole through which the positive electrode terminal 7 or the negative electrode terminal 9 can be inserted.

Figure 12:
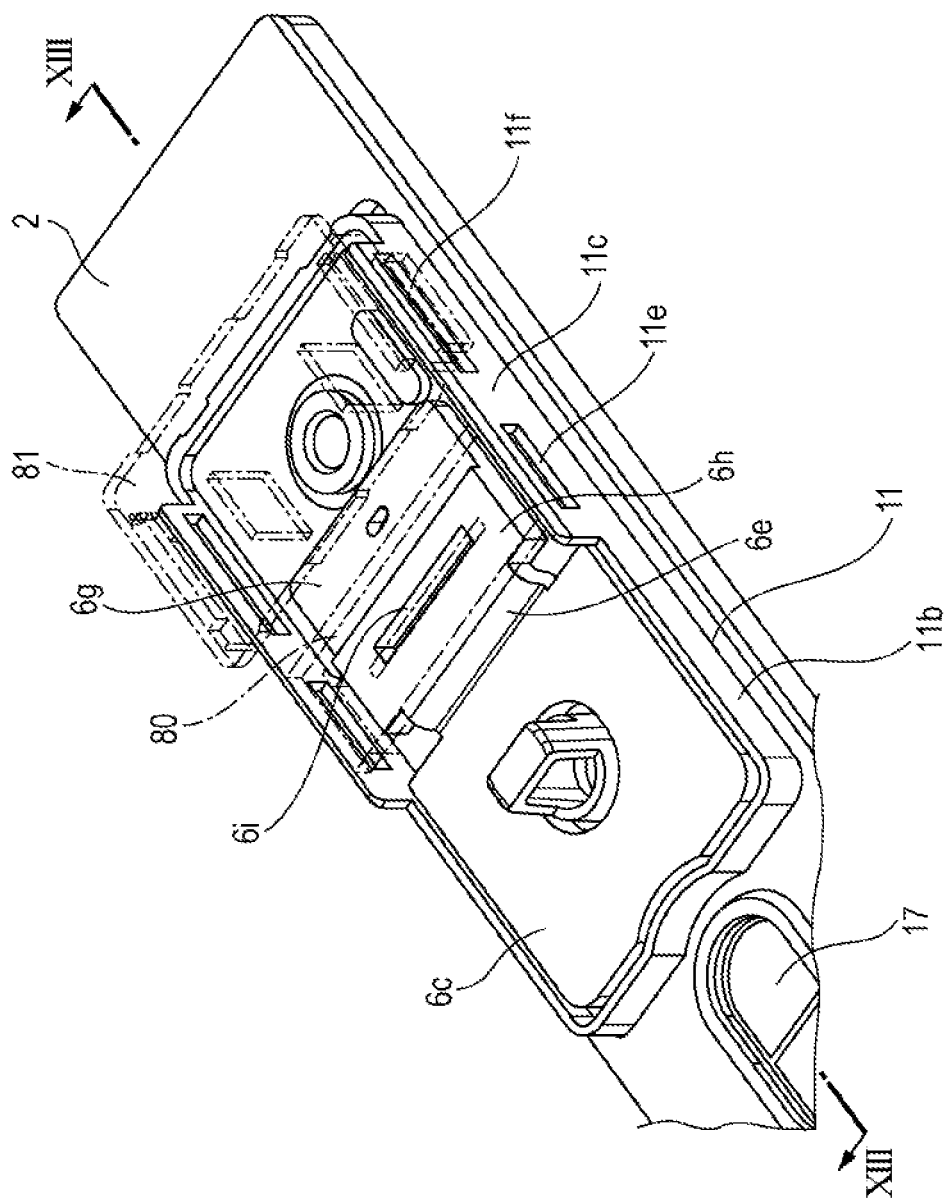
FIG. 12 is a perspective view of the positive electrode terminal of the sealing plate viewed from the electrode group side.

Referring to FIGS. 7 and 12, the inner insulating member 11 on the positive electrode side includes a base portion 11a disposed along the sealing plate 2. A rib 11b that protrudes towards the electrode group 3 side from the base portion 11a is provided on an outer peripheral edge of the base portion 11a. Wall portions 11c that extend the rib 11b towards the electrode group 3 side are provided on the rib 11b near the two sides of the positive electrode terminal conductive member 6a that extends along the longitudinal direction of the sealing plate 2. Furthermore, through holes 11e and 11f described later are provided in the wall portions 11c. An opening 11d is provided in the base portion 11a so as not to close the injection hole 15. The opening 11d does not have to be provided when the base portion 11a does not close the ejection hall 15.

Referring to FIG. 7, the inner insulating member 13 on the negative electrode side includes a base portion 13a disposed along the sealing plate 2. A rib 13b that protrudes towards the electrode group 3 side from the base portion 13a is provided on an outer peripheral edge of the base portion 13a.

A protrusion 8x is provided on a surface of the negative electrode terminal conductive member 8a on the electrode group 3 side. A shape of the protrusion 8x in plan view is, desirably, a shape including a longitudinal direction and a short direction such as a rectangle, an elliptic, or a track shape.

Assembling Each Component to Sealing Plate

The outer insulating member 10 is disposed on an outer surface side of the battery and in a vicinity of a positive electrode terminal insertion hole provided in the sealing plate 2. The inner insulating member 11 and the positive electrode terminal conductive member 6a are disposed on an inner surface side of the battery and in the vicinity of positive electrode terminal insertion hole of the sealing plate 2. Furthermore, the positive electrode terminal 7 is inserted through the through hole of the outer insulating member 10, the positive electrode terminal insertion hole of the sealing plate 2, the through hole of the inner insulating member 11, and the through hole of the positive electrode terminal conductive member 6a from the outer side of the battery, and an end of the positive electrode terminal 7 is riveted onto the positive electrode terminal conductive member 6a. With the above, the positive electrode terminal 7 and the positive electrode terminal conductive member 6a are fixed to the sealing plate 2 (see FIG. 13). Note that the riveted portion of the positive electrode terminal 7 and the positive electrode terminal conductive member 6a can be welded to each other.

Subsequently, the outer insulating member 12 is disposed on an outer surface side of the battery and in a vicinity of a negative electrode terminal insertion hole in the sealing plate 2. The inner insulating member 13 and the negative electrode terminal conductive member 8a are disposed on an inner surface side of the battery and in the vicinity of negative electrode terminal insertion hole of the sealing plate 2. Furthermore, the negative electrode terminal 9 is inserted through the through hole of the outer insulating member 12, the negative electrode terminal insertion hole of the sealing plate 2, the through hole of the inner insulating member 13, and the through hole of the negative electrode terminal conductive member 8a from the outer side of the battery, and an end of the negative electrode terminal 9 is riveted onto the negative electrode terminal conductive member 8a. With the above, the negative electrode terminal 9 and the negative electrode terminal conductive member 8a are fixed to the sealing plate 2. Note that the riveted portion of the negative electrode terminal 9 and the negative electrode terminal conductive member 8a can be welded to each other.

Positive Electrode Collector

Figure 8:
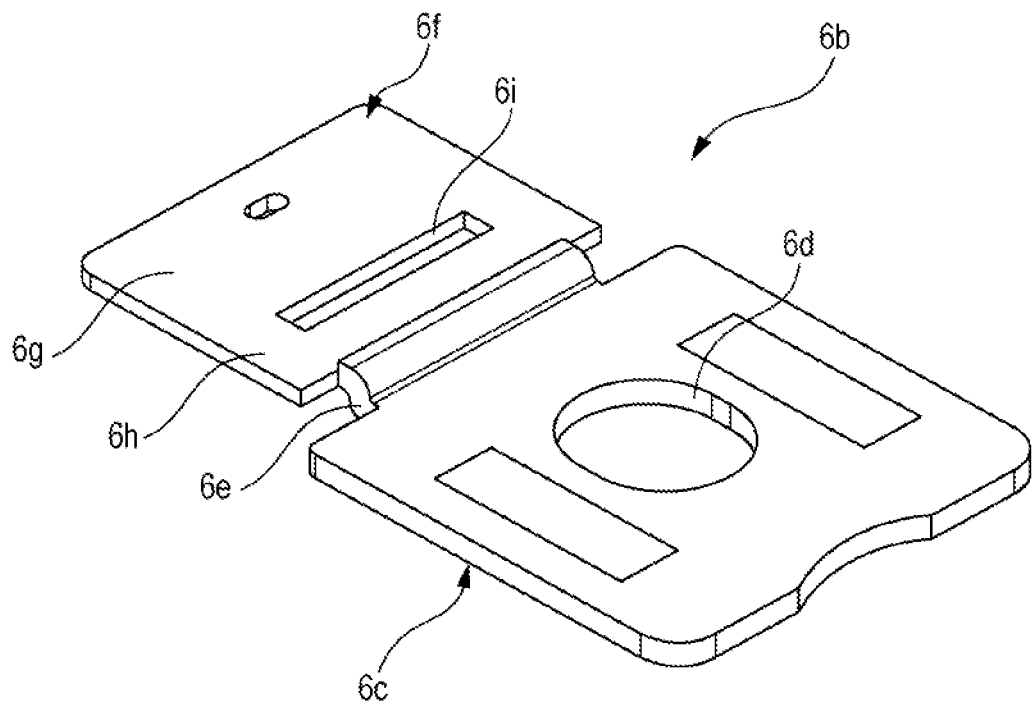
FIG. 8 is a perspective view of the positive electrode collector according to the exemplary embodiment.
Figure 9:
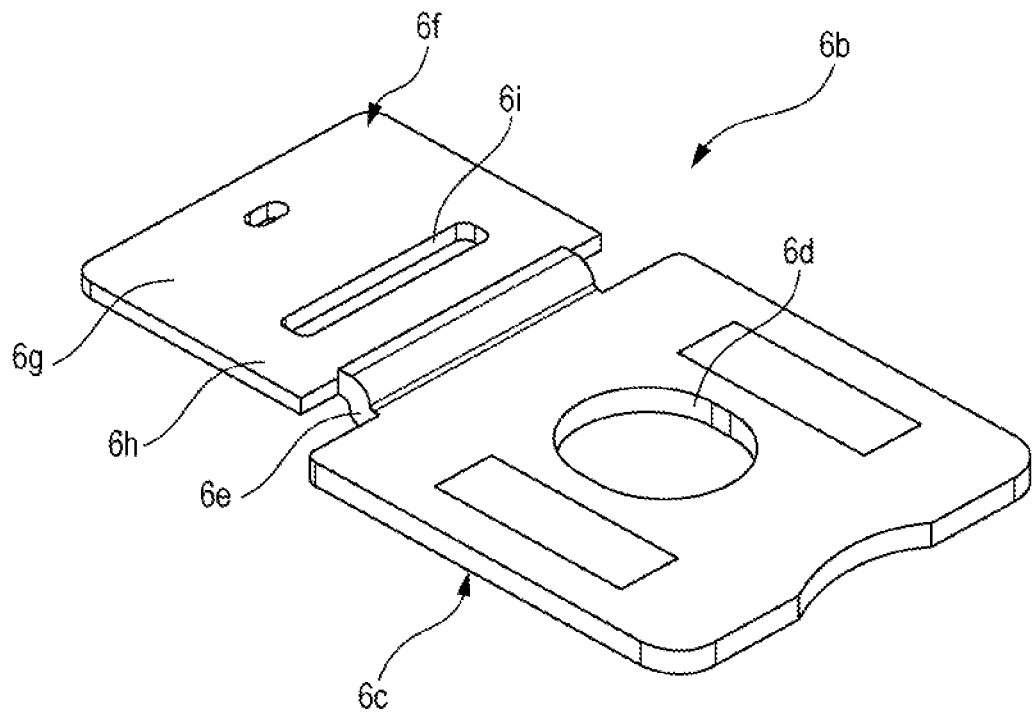
FIG. 9 is a perspective view of a modification of the positive electrode collector according to the exemplary embodiment.
Figure 10:
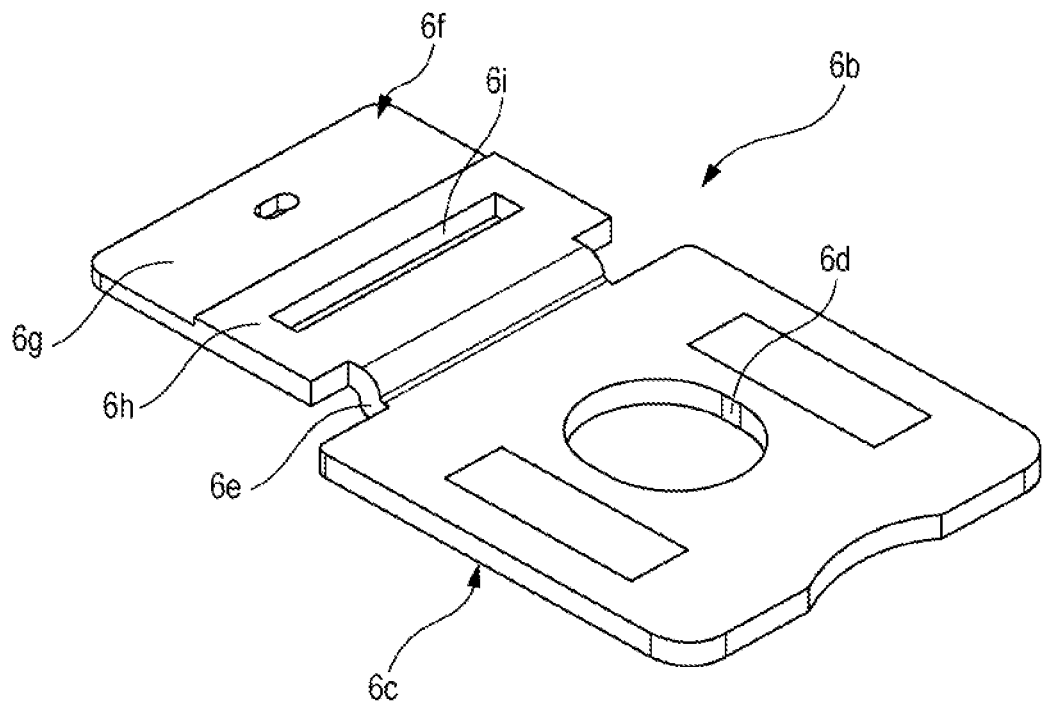
FIG. 10 is a perspective view of a modification of the positive electrode collector according to the exemplary embodiment.
Figure 11:
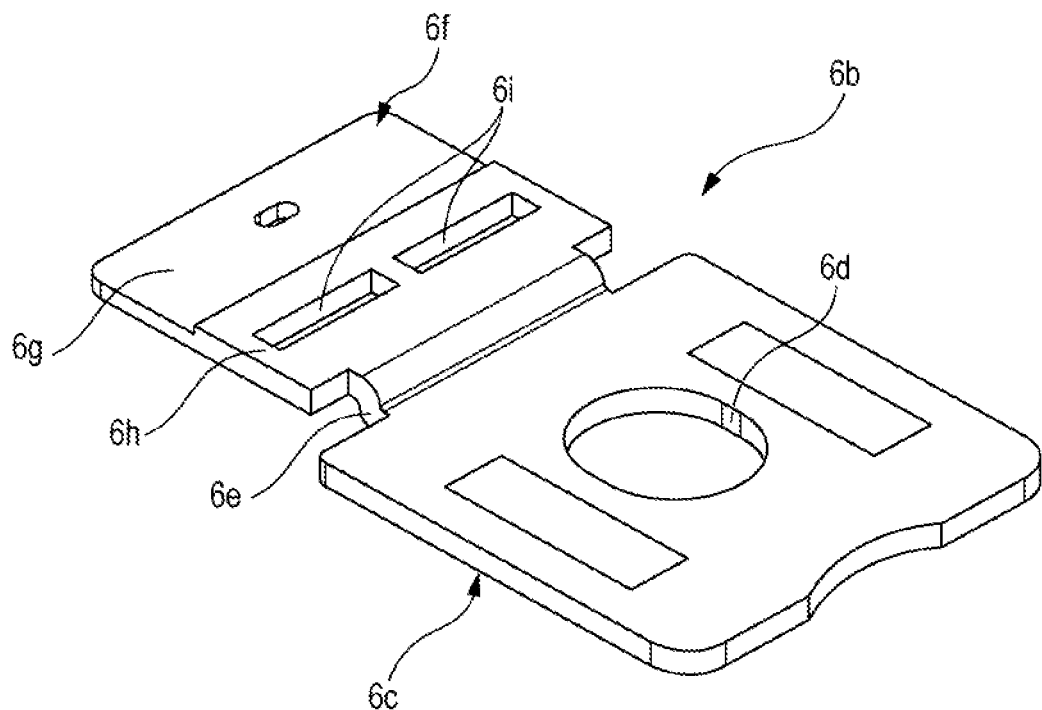
FIG. 11 is a perspective view of a modification of the positive electrode collector according to the exemplary embodiment.

FIG. 8 is a perspective view of the positive electrode collector 6b used in the secondary battery of the present disclosure. Furthermore, FIGS. 9 to 11 are modifications of the positive electrode collector 6b. Note that a direction that extends along a flat surface of the collector 6b and that is perpendicular to a direction in which the first connection portion 6c, the connecting portion 6e, and the second connection portion 6f are connected to each other is referred to as a width direction, and a direction orthogonal to the flat surface is referred to as a thickness direction.

The positive electrode tab groups 40a and 40b are connected to the first connection portion 6c. Alternatively, a tab conductive member (not shown) connected to the positive electrode tabs 40 may be separately prepared, the tab conductive member may be connected to the first connection portion, and the positive electrode tab groups 40a and 40b and the first connection portion 6c may be connected to each other through the tab conductive member. Furthermore, an opening 6d is provided so that the first connection portion 6c does not close the injection hole 15. When the first connection portion 6c does not close the injection hole 15, the opening 6d does not have to be provided.

The second connection portion 6f is configured of a terminal-side connection portion 6g, and a fuse portion 6h between the terminal-side connection portion 6g and the connecting portion 6e.

The terminal-side connection portion 6g can connect the positive electrode terminal 7 thereto through the terminal conductive member 6a, and can also directly connect the positive electrode terminal 7 thereto. As illustrated in FIGS. 10 and 11, the terminal-side connection portion 6g may be thinner than the other portions in the positive electrode collector 6b so that it is the easier to join the positive electrode terminal 7 or the terminal conductive member 6a thereto.

A through hole 6i is provided in the fuse portion 6h. The fuse portion 6h is thermally cut when an overcurrent flows from the positive electrode tab groups 40a and 40b to the positive electrode terminal 7, so that the electric current is cut off. The shape of the through hole 6i and the number of through holes 6i are not limited to any shape and number. As illustrated in FIGS. 8, 10, and 11, the through hole 6i may have a narrow rectangular shape long in the short direction of the positive electrode collector 6b or an elliptic shape as in FIG. 9, or a plurality of holes can be provided as in FIG. 11. While obtaining the strength of the positive electrode collector 6b, the portion where the through hole 6i is provided is designed so that the cross-sectional area thereof is the smallest in the current path from the positive electrode tab groups 40a and 40b to the positive electrode terminal 7 so that when there is a flow of an electric current that is equivalent to or larger than a set current value, the electric current is cut off.

The connecting portion 6e connects the first connection portion 6c and the second connection portion 6f to each other. Bending may be performed on the connecting portion 6e so that a difference in level is provided between the first connection portion 6c and the second connection portion 6f.

When providing the connecting portion 6e, by having the width of the connecting portion 6e be narrower than those of the first connection portion 6c and the second connection portion 6f, bending of the connecting portion 6e is facilitated.

Connecting Terminal Conductive Member and Collector to Each Other

Figure 13:
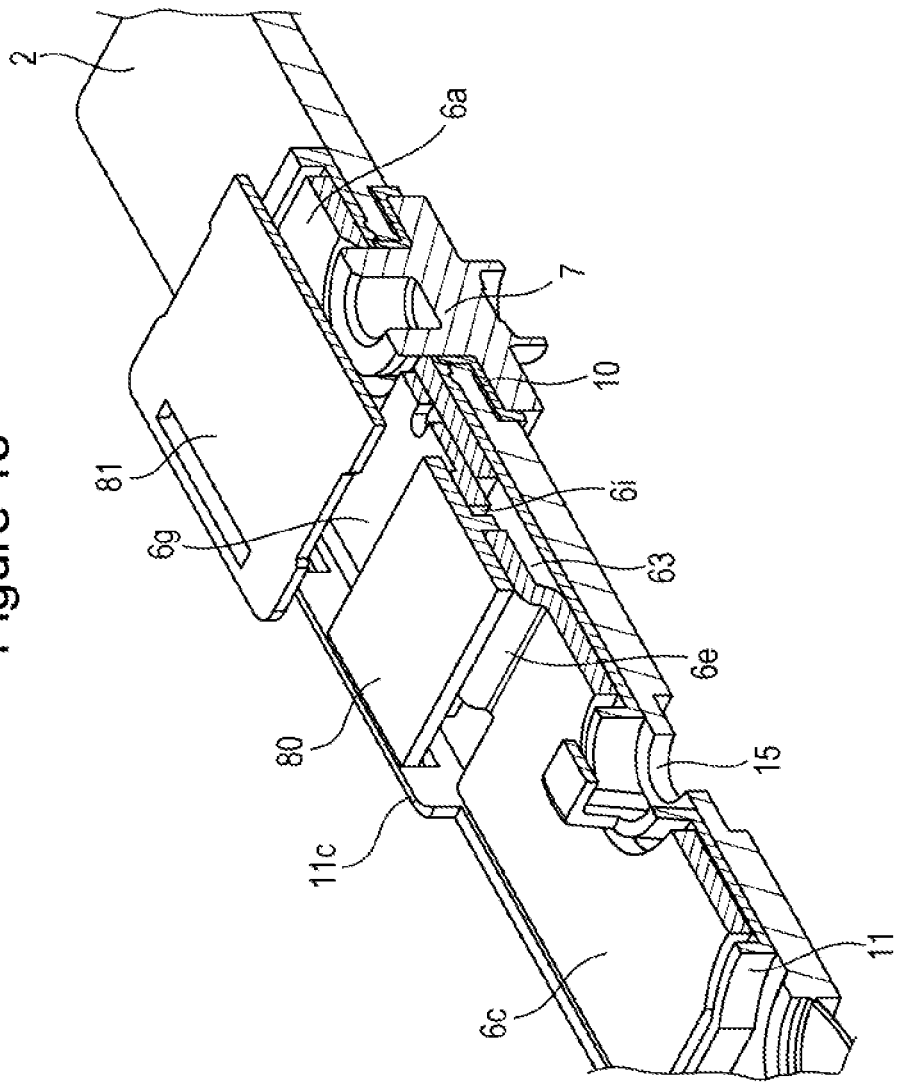
FIG. 13 is a cross-sectional perspective view taken along line XIII-XIII in FIG. 12.

FIG. 12 is a perspective view of the sealing plate 2, to which the positive electrode collector 6b, a fuse holding member 80, and a terminal protecting member 81 have been mounted, viewed from the electrode body side. In FIG. 12, illustration of the positive electrode tab groups 40a and 40b is omitted, and the components under the fuse holding member 80 and the terminal protecting member 81 are illustrated in a see-through manner. FIG. 13 is a cross-sectional perspective view taken along line XIII-XIII in FIG. 12.

The first connection portion 6c of the positive electrode collector 6b to which the positive electrode tab groups 40a and 40b are connected is disposed on the base portion 11a of the inner insulating member 11. Furthermore, the terminal-side connection portion 6g is disposed on the positive electrode terminal conductive member 6a and is joined to the positive electrode terminal conductive member 6a. Regarding the joining method, the two members can be joined to each other by irradiation of an energy line such as a laser beam.

Note that as described above, the connecting portion 6e is bent to provide a difference in level between the first connection portion 6c and the second connection portion 6f. By connecting the terminal-side connection portion 6g and the positive electrode terminal conductive member 6a to each other, as illustrated in FIG. 13, the fuse portion 6h and the inner insulating member 11 will not be in contact with each other and a space 63 can be provided between the two members. Since the fuse portion 6h is not in contact with the inner insulating member 11, when the fuse portion 6h is actuated, the inner insulating member 11 can be prevented from being damaged by sparks and heat. Accordingly, the sealing plate 2 and the positive electrode collector 6b can be prevented from being reconnected.

Referring to FIGS. 6 and 7, the first connection portion 8c of the negative electrode collector 8b connected to the negative electrode tab groups 50a and 50b is disposed on the base portion 13a of the inner insulating member 13. A through hole 8d including a thin portion at a peripheral edge thereof is provided in the second connection portion 8f. The second connection portion 8f is disposed on the negative electrode terminal conductive member 8a while the through hole 8d is fitted to the protrusion 8x provided in the negative electrode terminal conductive member 8a. Accordingly, the fitting portion is joined. Regarding the joining method, the fitting portion can be joined by irradiation of an energy line such as a laser beam.

Fuse Holding Member

As illustrated in FIGS. 12 and 13, the fuse holding member 80 straddling the fuse portion 6h is fitted into the through holes 11e provided in the wall portions 11c extended from the rib 11b of the inner insulating member 11. The fuse holding member 80 prevents the sparks and pieces of the fuse created when the fuse has been actuated from dropping on the electrode bodies and prevents internal short-circuiting from occurring. Accordingly, the fuse holding member desirably covers at least the fuse portion, and more desirably covers the fuse portion 6h while exceeding the width of the fuse portion 6L.

Furthermore, as illustrated in FIG. 13, the fuse holding member 80 can have a structure that enters inside the through hole 6i of the fuse portion 6h. By having such a structure, reconnection caused by the thermally cut fuse portion moving is prevented.

Terminal Protecting Member

As illustrated in FIGS. 12 and 13, the terminal protecting member 81 is fitted and fixed to through holes 11f provided in the wall portions 11c of the inner insulating member 11. The terminal protecting member 81 prevents short-circuiting caused by the positive electrode terminal 7 and the electrode bodies 3a and 3b coming in contact with each other.

Fabrication of Electrode Group

Stacking-direction surfaces of the electrode body 3a and the electrode body 3b are made to oppose each other directly or through another member while the positive electrode tab groups 40a and 40b and the negative electrode tab groups 50a and 50b are bent accordingly. With the above, the electrode body 3a and the electrode body 3b are unified as a single electrode group 3. The electrode bodies 3a and 3b can be fixed to each other by winding an adhesive tape or the like around the outer peripheral surfaces of the unified electrode bodies 3a and 3b. Alternatively, the electrode bodies 3a and 3b can be unified as one by disposing the electrode bodies 3a and 3b inside the electrode body holder 14 formed in a box shape or a bag shape.

The electrode group 3 wrapped in the electrode body holder 14 made of a resin sheet formed in a box shape or a bag shape is inserted into the square outer package 1. Subsequently, the sealing plate 2 and the opening of the square outer package 1 are fitted to each other and the fitted portion is welded so that the opening of the square outer package 1 is sealed with the sealing plate 2. Subsequently, the electrolyte is injected into the square outer package 1 through the electrolyte injection hole 15 provided in the sealing plate 2. After the above, the electrolyte injection hole 15 is sealed with a sealing member 16 such as a blind rivet.

In the square secondary battery 20 according to the exemplary embodiment described above, the positive electrode tab groups 40a and 40b and the negative electrode tab groups 50a and 50b are disposed at the end portions of the electrode group 3 on the sealing plate 2 side. Furthermore, the positive electrode tab groups in the bent state are connected to a surface of the positive electrode collector 6b, which is disposed along the sealing plate 2, on the electrode group 3 side. Furthermore, the negative electrode tab groups in the bent state are connected to a surface of the negative electrode collector 8b, which is disposed along the sealing plate 2, on the electrode group 3 side. With such a configuration, the secondary battery becomes one with a higher volume energy density.

Others

In the exemplary embodiment described above, an example in which the electrode group 3 is formed of two electrode bodies 3a and 3b has been given; however, it is not limited to the above. The electrode group 3 may be configured of three or more electrode bodies. Furthermore, each of the electrode bodies is not limited to a stacked electrode body and may be a wound electrode body in which a belt-shaped positive electrode plate and a belt-shaped negative electrode plate having a belt-shaped separator interposed in between are wound. Furthermore, the electrode body 3a alone may be provided. Furthermore, the electrode body 3a may be a wound electrode body in which a belt-shaped positive electrode plate and a belt-shaped negative electrode plate having a belt-shaped separator interposed in between are wound.

The outer insulating members 10 and 12, the inner insulating members 11 and 13, the fuse holding member 80, and the terminal protecting member 81 may use an insulating member, which is desirably made of resin. For example, polyethylene (PP), polyethylene (PE), or polyphenylene sulfide (PPS) may be used.

A laser or electron beam can be used as the energy line used in welding.

Known materials can be used for the positive electrode plate, the negative electrode plate, the separator, the electrolyte, and other members. The battery system of the secondary battery of the present disclosure is not limited to any battery system. For example, the battery system may be a nonaqueous electrolyte secondary battery such as a lithium ion battery. Furthermore, the shape of the secondary battery of the present disclosure is not limited to a particular shape.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body including a tab;
an outer package that houses the electrode body;
a sealing plate that seals the outer package and that includes a terminal;
a collector that electrically connects the tab and the terminal to each other; and
a terminal conductive member that electrically connects the collector with the terminal, wherein the terminal conductive member includes a terminal through hole where an edge portion of the terminal housed in the outer package is inserted through,
wherein
the collector opposes the sealing plate with an insulating member in between,
the collector includes a first connection portion, a connecting portion, and a second connection portion,
the tab or a tab conductive member connected to the tab is connected to the first connection portion,
the connecting portion connects the first connection portion and the second connection portion to each other,
the second connection portion includes a terminal-side connection portion to which the terminal conductive member is joined, and a fuse portion provided with a through hole between the terminal-side connection portion and the connecting portion,
a joined portion between the terminal conductive member and the terminal-side connection portion and the fuse portion are aligned between the terminal through hole and the first connection portion in a longitudinal direction of the sealing plate,
the fuse portion does not come in contact with the insulating member, the terminal, and the terminal conductive member, and
by having a cross-sectional area in a portion of the through hole be smallest in a current path from the tab to the terminal, the fuse portion is thermally cut when an overcurrent flows between the tab and the terminal.

2. The secondary battery according to claim 1, wherein a space is provided between the fuse portion and the insulating member.

3. The secondary battery according to claim 1, wherein a width of the connecting portion is smaller than a width of the first connection portion and a width of the second connection portion.

4. The secondary battery according to claim 1, wherein the connecting portion connects the first connection portion and the second connection portion so that there is a difference in level therebetween.

5. The secondary battery according to claim 1, wherein a thickness of the terminal-side connection portion is smaller than that of the first connection portion.

6. The secondary battery according to claim 1, wherein a plurality of the through holes are arranged in a width direction of the fuse portion.

7. The secondary battery according to claim 1, further comprising a fuse holding member provided between the electrode body and the fuse portion, the fuse holding member covering the through hole and being formed of an insulating material.

8. The secondary battery according to claim 7, wherein the fuse holding member enters inside the through hole.

9. The secondary battery according to claim 7, wherein the fuse holding member covers the fuse portion while exceeding a width of the fuse portion.

10. A secondary battery comprising:

an electrode body including a tab;

an outer package that houses the electrode body;

a sealing plate that seals the outer package and that includes a terminal;

a collector that electrically connects the tab and the terminal to each other; and a fuse holding member, wherein the collector opposes the sealing plate with an insulating member in between, the collector includes a first connection portion, a connecting portion, and a second connection portion, the tab or a tab conductive member connected to the tab is connected to the first connection portion, the connecting portion connects the first connection portion and the second connection portion to each other, the second connection portion includes a terminal-side connection portion to which the terminal or the terminal conductive member connected to the terminal is connected, and a fuse portion provided with a through hole between the terminal-side connection portion and the connecting portion, the fuse portion does not come in contact with the insulating member, the terminal, and the terminal conductive member, and the fuse holding member is provided between the electrode body and the fuse portion, the fuse holding member covering the through hole and being formed of an insulating material, wherein the fuse holding member is fixed to the insulating member, wherein a rib is provided in an outer peripheral edge of the insulating member and the rib includes a wall portion that protrudes more than the fuse portion, the wall portion includes a wall portion through hole, and the fuse holding member straddling the fuse portion is fitted and fixed to the wall portion through hole, and by having a cross-sectional area in a portion of the through hole be smallest in a current path from the tab to the terminal, the fuse portion is thermally cut when an overcurrent flows between the tab and the terminal.

11. A secondary battery comprising:

An electrode body including a tab;

an outer package that houses the electrode body;

a sealing plate that seals the outer package and that includes a terminal; and a collector that electrically connects the tab and the terminal to each other, wherein the collector opposes the sealing plate with an insulating member in between, the collector includes a first connection portion, a connecting portion, and a second connection portion, the tab or a tab conductive member connected to the tab is connected to the first connection portion, the connecting portion connects the first connection portion and the second connection portion to each other, the second connection portion includes a terminal-side connection portion to which the terminal or a terminal conductive member connected to the terminal is connected, and a fuse portion provided with a through hole between the terminal-side connection portion and the connecting portion, the fuse portion does not come in contact with the insulating member, the terminal, and the terminal conductive member, wherein a thickness of the terminal-side connection portion is smaller than one of the fuse portion, wherein a face of the fuse portion near the electrode body is closer to the electrode body than a face of the terminal-side connection portion near the electrode body in a thickness direction of the sealing plate, and wherein by having a cross-sectional area in a portion of the through hole be smallest in a current path from the tab to the terminal, the fuse portion is thermally cut when an overcurrent flows between the tab and the terminal.

12. The secondary battery according to claim 11, wherein the connecting portion connects the first connection portion and the second connection portion so that there is a difference in level therebetween.

13. The secondary battery according to claim 11, wherein a thickness of the terminal-side connection portion is smaller than that of the first connection portion.

14. The secondary battery according to claim 11, further comprising a fuse holding member provided between the electrode body and the fuse portion, the fuse holding member covering the through hole and being formed of an insulating material.

15. The secondary battery according to claim 14, wherein the fuse holding member enters inside the through hole.

* * * * *